United States Patent
Li et al.

(10) Patent No.: US 11,147,244 B2
(45) Date of Patent: *Oct. 19, 2021

(54) PREMIXED UNDERGROUND VENTILATED HENHOUSE

(71) Applicant: New Hope Liuhe Feed Co., Ltd., Shandong (CN)

(72) Inventors: Changwu Li, Shandong (CN); Feng Xiao, Shandong (CN); Longhai Liu, Shandong (CN); Jianmin Wang, Shandong (CN); Chengjun Min, Shandong (CN); He Huang, Shandong (CN); Zhengpeng Zhu, Shandong (CN); Lei Yan, Shandong (CN); Xin Li, Shandong (CN)

(73) Assignee: New Hope Liuhe Feed Co., Ltd., Shandong (CN)

( * ) Notice: Subject to any disclaimer, the term of this patent is extended or adjusted under 35 U.S.C. 154(b) by 440 days.

This patent is subject to a terminal disclaimer.

(21) Appl. No.: 16/300,053

(22) PCT Filed: Aug. 3, 2017

(86) PCT No.: PCT/CN2017/095739
§ 371 (c)(1),
(2) Date: Nov. 8, 2018

(87) PCT Pub. No.: WO2018/072529
PCT Pub. Date: Apr. 26, 2018

(65) Prior Publication Data
US 2019/0150407 A1    May 23, 2019

(30) Foreign Application Priority Data
Oct. 21, 2016   (CN) .......................... 201610918768.6

(51) Int. Cl.
*A01K 31/20* (2006.01)
*A01K 1/00* (2006.01)
*F24F 7/10* (2006.01)

(52) U.S. Cl.
CPC ............ *A01K 31/20* (2013.01); *A01K 1/0047* (2013.01); *F24F 7/10* (2013.01)

(58) Field of Classification Search
CPC ...... A01K 31/20; A01K 31/18; A01K 1/0047; A01K 1/007; A01K 1/0076; A01K 1/0082;
(Continued)

(56) References Cited

U.S. PATENT DOCUMENTS

| 4,043,256 A * | 8/1977 | Van Huis ............. A01K 1/0064 454/238 |
| 6,357,512 B1 * | 3/2002 | Baer ....................... F24S 90/10 165/48.2 |

(Continued)

FOREIGN PATENT DOCUMENTS

| CN | 202697462 | 1/2013 |
| CN | 203136769 | 8/2013 |

(Continued)

OTHER PUBLICATIONS

"International Search Report (Form PCT/ISA/210)", dated Nov. 27, 2017, with English translation thereof, pp. 1-6.

*Primary Examiner* — Magdalena Topolski
(74) *Attorney, Agent, or Firm* — JCIPRNET

(57) ABSTRACT

A premixed underground ventilated henhouse includes a gable, a sidewall, a roof and a floor. An inner chamber is further provided in the middle of the henhouse. A partition is hermetically provided between the sidewall and an inner wall. An air inlet plate is provided between the two inner walls. A plurality of fans and a plurality of air inlet windows are uniformly provided on an inner roof. A plurality of wet curtains and an air vent are provided on the sidewall. Air outlet slots are uniformly provided on the inner wall. An underground exhaust bunker is provided under the floor. A vent pipe and a fan are provided on one side of the underground exhaust bunker. An air outlet is provided at an upper end of the vent pipe.

20 Claims, 4 Drawing Sheets

(58) Field of Classification Search
CPC .. A01K 1/0064; A01K 1/0052; A01K 1/0058; F24F 7/10
USPC .......................................................... 119/448
See application file for complete search history.

(56) References Cited

U.S. PATENT DOCUMENTS

2002/0007801 A1    1/2002  Lemmon et al.
2011/0146582 A1*   6/2011  Lemmon .............. A01K 1/0052
                                                    119/448
2017/0347617 A1*  12/2017  King .................... A01K 1/007

FOREIGN PATENT DOCUMENTS

| | | | | |
|---|---|---|---|---|
| CN | 105188352 | * | 10/2014 | ............ F28F 9/001 |
| CN | 204409181 |   | 6/2015 | |
| CN | 106359163 |   | 2/2017 | |
| CN | 106386562 |   | 2/2017 | |
| CN | 206165474 |   | 5/2017 | |
| CN | 206284083 |   | 6/2017 | |
| CN | 206284084 |   | 6/2017 | |
| CN | 206284085 |   | 6/2017 | |
| EP | 1389420 |   | 2/2004 | |
| FR | 2741425 |   | 5/1997 | |
| JP | S63142627 |   | 9/1988 | |
| JP | H08103185 |   | 4/1996 | |
| KR | 0156293 B1 | * | 10/1998 | ........... A01K 1/0052 |
| WO | 2002069664 A | * | 1/2001 | ............... A01K 1/02 |
| WO | WO-2014175288 A1 | * | 10/2014 | ............ F28F 9/001 |

\* cited by examiner

PREMIXED UNDERGROUND VENTILATED HENHOUSE

CROSS-REFERENCE TO RELATED APPLICATION

This is a 371 application of the International PCT application serial no. PCT/CN2017/095739, filed on Aug. 3, 2017, which claims the priority benefits of China Application No. 201610918768.6, filed on Oct. 21, 2016. The entirety of each of the above-mentioned patent applications is hereby incorporated by reference herein and made a part of this specification.

TECHNICAL FIELD

The present invention relates to a henhouse, and more particularly, to a premixed underground ventilated henhouse.

BACKGROUND

At present, a henhouse is mostly ventilated in a manner of negative pressure ventilation. One gable is provided with a fan thereon, and two sidewalls are provided with a plurality of side wind windows thereon, and fan operates to cause a negative pressure inside the henhouse, so that wind enters through the side wind windows. However, the wind entering the henhouse is relatively strong, especially in seasons of autumn and winter, with a large volume of urgent and cold air. The cold air partially sinks quickly, which is unable to be evenly mixed with the hot air in the henhouse, thereby rendering fowls uncomfortable. Moreover, a majority of henhouses are provided with a built-in wet curtain, which is embedded in the sidewall of the henhouse. An outer surface of which is merely provided with a simple dust screen, so when an outdoor temperature is excessively low, especially in cold winter in the north, the outdoor cold air is apt to enter the henhouse through the wet curtain, resulting in problems such as that the henhouse is hard to be warmed up. Patent Application No. 201320159133.4 and Patent Publication No. 203136769U disclose an aerosol-type ventilated henhouse, in which a vent-pipe ventilated with external environment is provided on the gable and the sidewall of the henhouse, which is able to achieve an effect of evenly mixing the air. But, foul gases sink and accumulate below within the henhouse, so there are still problems such as that foul gases are hard to be exhausted, and ammonia excesses the standard. In addition, temperature and humidity of outside air are unable to be adjusted and controlled according to an actual situation of the henhouse, which results in a poor overall ventilation effect on the henhouse, and affects health of the fowls.

SUMMARY

An objective of the present invention is to provide a premixed underground ventilated henhouse with uniform inlet air velocity, easy exhaustion of foul gases, adjustable inlet air temperature and humidity, and fast air renewal speed.

The present invention is implemented by taking measures below. A premixed underground ventilated henhouse includes a gable, a sidewall, a roof, and a floor. An inner chamber parallel to the sidewall is provided in the middle of the henhouse. A rearing cage of the henhouse is located in the inner chamber. The inner chamber includes an inner wall parallel to the sidewall and an inner roof.

A partition is hermetically provided between the sidewall and the inner wall. An air inlet plate is provided between the two inner walls located below the inner roof. A pressure chamber is formed between the inner roof and the air inlet plate. A premixing chamber is formed between the inner roof and the roof. A plurality of fans and a plurality of air inlet windows are uniformly provided on the inner roof. A plurality of air inlet holes and a plurality of small inlet windows are uniformly provided on the air inlet plate. A plurality of wet curtains are provided on the sidewall located above the partition. A plurality of air outlet slots are uniformly provided on the inner wall located below the partition. An air vent and a fan are provided on the sidewall located below the partition. A side length of the small inlet window is smaller than a side length of the air inlet window. The air inlet hole and the small inlet window on the air inlet plate are able to ensure uniformity of the air premixed and uniform speed of the air inlet to the inner chamber.

An underground exhaust bunker is provided under the floor. A plurality of through holes in communication with the underground exhaust bunker are provided on the floor. A plurality of air vents are provided on one side of the underground exhaust bunker. The air vent is connected with a vent pipe. A fan is provided in a lower end of the vent pipe, and an air outlet is provided at an upper end of the vent pipe.

An air deflector is provided between the sidewall and the inner wall above the partition located below the wet curtain, and the air deflector includes a cambered-surface portion at a lower end thereof, and a straight-surface portion at an upper end thereof. The cambered-surface portion of the air deflector is provided between the sidewall and the inner wall. The straight-surface portion of the air deflector is located above the inner roof. The straight-surface portion is inclined upward and inward with an inclination angle equal to or slightly smaller than an inclination angle of the roof. The cambered-surface portion and the straight-surface portion of the air deflector are integrally formed as one piece, or the cambered-surface portion and the straight-surface portion of the air deflector are hinged through a damping shaft.

A warm water pipe and/or an atomization pipeline is provided on the gable located above the inner roof. The warm water pipe has hot water circulating therein. The atomization pipeline is a piping uniformly provided with small holes. One end of the atomization pipeline is connected with a high pressure water source, and another end of the atomization pipeline is sealed off.

One side of the bottom surface of the underground exhaust bunker away from the vent pipe is inclined downward. One side of the underground exhaust bunker away from the vent pipe is provided with a plurality of sewage drain pipes. A drain groove is provided on the ground close to a water outlet end of the sewage drain pipe.

The bottom surface of the underground exhaust bunker is uniformly provided with a plurality of support platforms. An upper-end surface of the support platform is connected with a lower-end surface of the floor.

The wet curtain includes a fixing plate, a wet curtain body embedded on the fixing plate, and two thermal insulation curtains provided on two sides of the wet curtain body.

Two side surfaces of a middle portion of the fixing plate are both inwardly recessed to form a central square plate and a frame. A middle portion of the central square plate is provided with a square through hole. The wet curtain body is embedded on the square through hole of the central square plate. The wet curtain body is hermetically connected with the central square plate.

The thermal insulation curtain includes a scroll and a curtain body. The scroll is provided on the frame on two sides of the central square plate. An upper end of the curtain body is fixedly connected with the scroll. Left and right sides of the curtain body are both fixedly connected with a plurality of rigid guide sheets connected with each other in a head-to-tail manner. A lower end of the curtain body is provided with a rigid connecting plate. The frame on two sides of the curtain body is provided with a slide groove used in conjunction with the rigid guide sheet.

A water inlet and a water outlet in communication with the wet curtain body are respectively provided on the frames located at an upper end and a lower end of the wet curtain body.

An outer surface of the rigid connecting plate at the lower end of the curtain body is provided with a handle. A lower-end surface of two ends of the handle is respectively provided with a stopper pin, and two locking mechanisms used in conjunction with the stopper pin are provided within the frame at the lower end of the wet curtain body.

Two connecting rods are provided between the handles on both sides of the wet curtain body. Two strip-shaped through holes are provided on the central square plate on both sides of the wet curtain body. The central square plate is provided thereon with an elastic sealing tape which seals the strip-shaped through hole. A slit is provided in a middle portion of the sealing tape. The connecting rod passes through the slit of the sealing tape to get connected with the handle.

The locking mechanism includes a fixed clamp arm and a movable clamp arm. The fixed clamp arm is hinged with a middle portion of the movable clamp arm and is provided with a torsion spring. An inner side of an upper end of the fixed clamp arm is provided with an L-shaped notch. An inner side of an upper end of the movable clamp arm is provided with an arc-surfaced notch. An inner side of the movable clamp arm located below the arc-surfaced notch is provided with an L-shaped notch, a protruding limit stopper is formed between the arc-surfaced notch and the L-shaped notch of the movable clamp arm. The L-shaped notch of the movable clamp arm corresponds in position to the L-shaped notch of the fixed clamp arm. An inner side of the lower end of the fixed clamp arm is provided with an electromagnet. An inner side of a lower end of the movable clamp arm is provided with an adsorption iron plate used in conjunction with the electromagnet. Wherein, all of the electromagnets are connected with a power source through a normally open button switch, and the normally open button switch is provided on the inner wall of the henhouse.

The stopper pin includes a connecting post fixed to a lower-end surface of the handle, and a hemispherical fixture block provided at a lower end of the connecting post.

The fixing plate is hermetically embedded in a wall body. A circulating water pipe in communication with the water inlet and the water outlet is provided in the wall body.

The rigid guide sheet and the rigid connecting plate are both made of stainless steel. The sealing tape is made of rubber. The curtain body of the thermal insulation curtain includes a waterproof inner layer, a waterproof outer layer, and a thermal insulation layer. The waterproof inner layer and the waterproof outer layer are made of waterproof cloth. The thermal insulation layer is made of thermal insulation cotton or glass wool felt.

Beneficial effects of the present invention are as follows. In the present invention, fresh air entering the henhouse is premixed with the air in the upper layer of the henhouse. The premixed air is uniformly taken into inner chamber through the pressure chamber, and foul air that sinks in a lower part of the henhouse will be smoothly discharged through the underground exhaust bunker and/or the air vent on the sidewall, so that an overall air renewal speed in the henhouse is controllable (that is, the fan on the sidewall or the fan on the vent pipe are selectively open, according to an actual demand on air renewal speed). Meanwhile, the warm water pipe and/or the atomization pipeline is further provided above the henhouse, i.e., in the premixing chamber, the warm water pipe is capable of providing a heat source according to needs to heat up the air within the premixing chamber. The atomization pipeline is capable of providing atomized cold water according to requirements, to cool down the air within the premixing chamber. The outdoor flesh air enters the premixing chamber in the upper portion of the henhouse by means of the air deflector through the wet curtain. The air in the premixing chamber is heated up or cooled down through the warm water pipe or the atomization pipeline according to the requirements. The pressure chamber discharges the mixed air into the inner chamber, and at a same time, the foul air inside the henhouse, especially the foul gas that sinks in the lower portion of the henhouse as mobilized by the fan of the sidewall and the fan of the vent pipe passes through the air outlet slot of the inner wall or the through hole of the floor to be discharged, while the fresh air sinks as a whole, so as to implement overall air renewal inside the henhouse. In addition, the wet curtain on the sidewall of the present invention is able to meet a demand for cooling down the henhouse when the outdoor temperature is relatively high, such as in summer. The thermal insulation curtain is also provided, which plays a role in keeping the henhouse warm when the outdoor temperature is relatively low, such as in winter, and plays a dustproof role on the wet curtain body. In the present invention, the wet curtain body is provided on a fixing plate, and the fixing plate is hermetically embedded on the sidewall of the henhouse, so in summer, when the wet curtain works normally, the henhouse can be normally ventilated and cooled. When winter comes, the henhouse can be thermally insulated according to the actual outdoor temperature. By pulling down the thermal insulation curtains on both sides of the wet curtain body, it is possible to avoid the outdoor cold air from entering the henhouse, so as to achieve an effect of heat preservation.

Wherein, reference signs are: 1. fan; 2. sidewall; 3. partition; 4. air deflector; 5. rearing cage; 6. air inlet plate; 7. warm water pipe; 8. atomization pipeline; 9. premixing chamber; 10. fan; 11. inner roof; 12. pressure chamber; 13. roof; 14. wet curtain; 15. air inlet hole; 16. small inlet window; 17. air inlet window; 18. inner wall; 19. air outlet; 20. straight-surface portion;

21. ground; 22. drain groove; 23. sewage drain pipe; 24. through hole; 25. underground exhaust bunker; 26. fan; 27. floor; 28. vent pipe; 29. support platform;

31. fixing plate; 32. curtain body; 33. handle; 34. wet curtain body; 35. water inlet; 36. central square plate; 37. slide groove; 38. sealing tape; 39. stopper pin; 40. scroll; 41. connecting rod; 42. connecting post; 43. hemispherical fixture block;

50. locking mechanism; 51. fixed clamp arm; 52. torsion spring; 53. electromagnet; 54. adsorption iron plate; 55. movable clamp arm; 56. L-shaped notch; 57. limit stopper; 58. L-shaped notch; 59. arc-surfaced notch.

DETAILED DESCRIPTION

In order to clearly illustrate the technical features of the present solution, the present solution will be described below through specific implementation modes.

Figure 1:
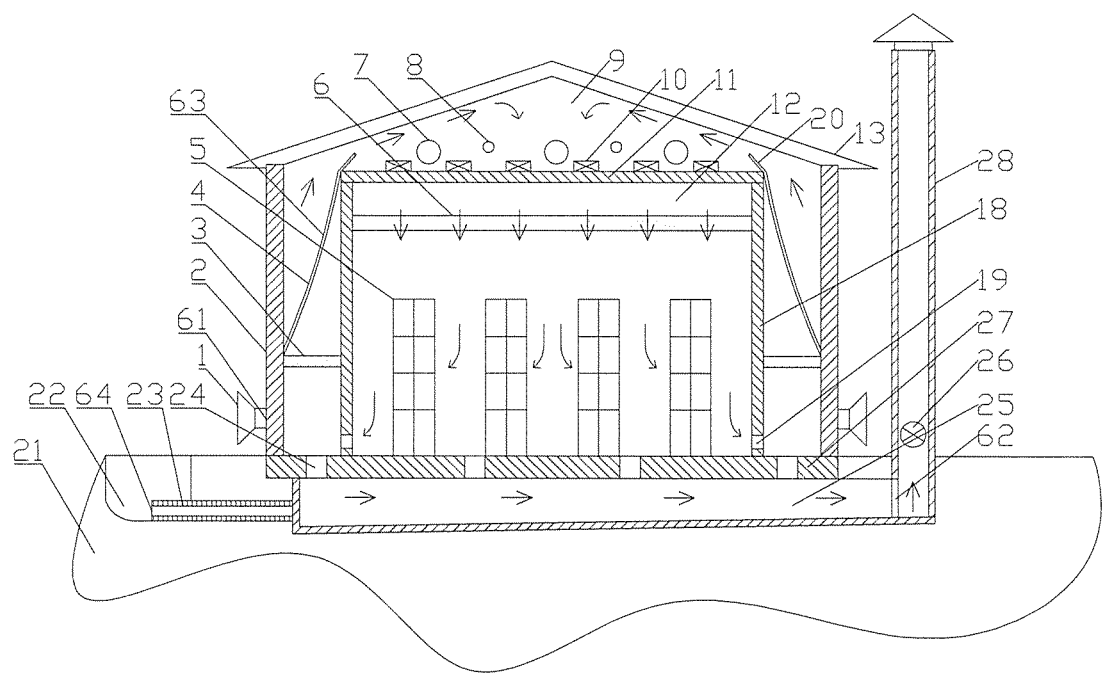
FIG. 1 is a structural schematic diagram of an embodiment of the present invention.
Figure 2:
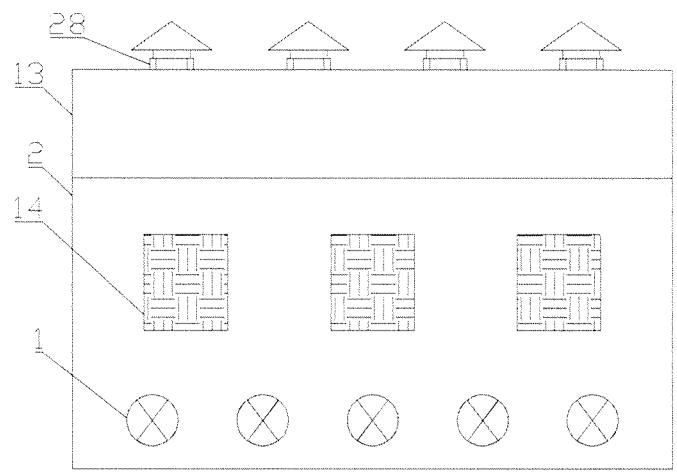
FIG. 2 is a left view of FIG. 1.

With reference to FIG. 1 and FIG. 2, the present invention relates to a premixed underground ventilated henhouse including a gable, a sidewall 2, a roof 13, and a floor 27. An inner chamber parallel to the sidewall 2 is provided in the middle of the henhouse. A rearing cage 5 of the henhouse is located in the inner chamber. The inner chamber includes an inner wall 18 parallel to the sidewall 2 and an inner roof 11.

Figure 3:
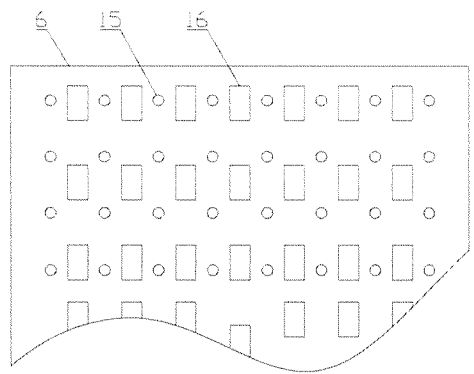
FIG. 3 is a partial view of an air inlet plate according to the embodiment of the present invention.
Figure 4:
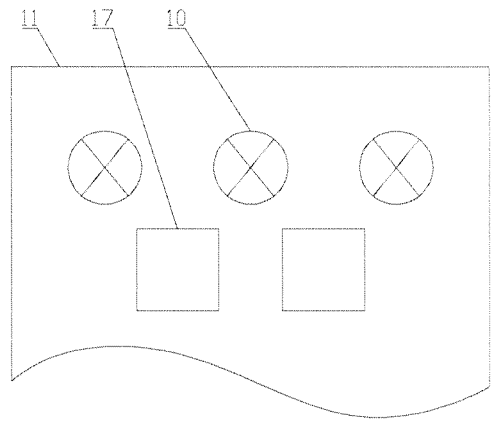
FIG. 4 is a partial view of an inner roof according to the embodiment of the present invention.
Figure 9:
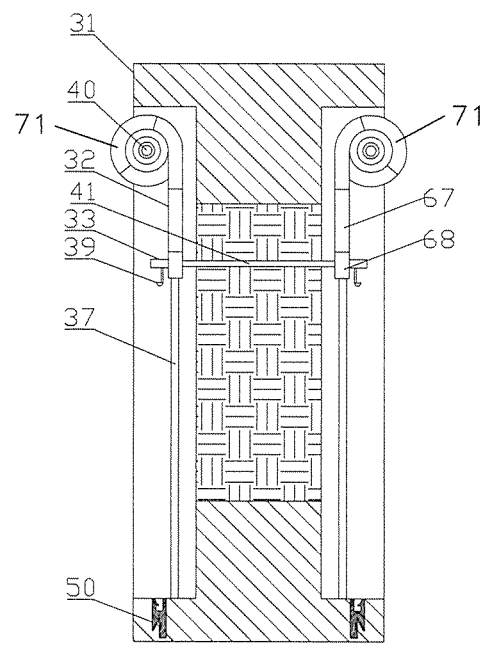
FIG. 9 is a partial view of the air inlet plate according to the embodiment of the present invention.
Figure 10:
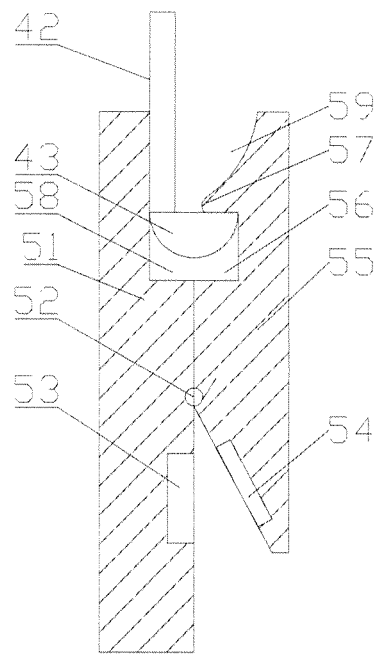
FIG. 10 is a partial view of the inner roof according to the embodiment of the present invention.

A partition 3 is hermetically provided between the sidewall 2 and the inner wall 18. An air inlet plate 6 is provided between the two inner walls 18 located below the inner roof 11. A pressure chamber 12 is formed between the inner roof 11 and the air inlet plate 6. A premixing chamber 9 is formed between the inner roof 11 and the roof 13. With reference to FIG. 4, a plurality of fans 10 and a plurality of air inlet windows 17 are uniformly provided on the inner roof 11. With reference to FIG. 3, a plurality of air inlet holes 15 and a plurality of small inlet windows 16 are uniformly provided on the air inlet plate 6. A plurality of wet curtains 14 are provided on the sidewall 2 located above the partition 3. A plurality of air outlet slots 19 are uniformly provided on the inner wall 18 located below the partition 3. An air vent 61 and a fan 1 are provided on the sidewall 2 located below the partition 3. Wherein, a side length of the small inlet window 16 is smaller than a side length of the air inlet window 17. The air inlet hole 15 and the small inlet window 16 on the air inlet plate 6 are able to ensure uniformity of the air premixed and uniform speed of the air inlet to the inner chamber. With reference to FIG. 9 and FIG. 10, an underground exhaust bunker 25 is provided under the floor 27, a plurality of through holes 24 in communication with the underground exhaust bunker 25 are provided on the floor 27. A plurality of air vents 62 are provided on one side of the underground exhaust bunker 25. The air vent 62 is connected with a vent pipe 28. A fan 26 is provided in the lower end of the vent pipe 28. An air outlet is provided at an upper end of the vent pipe 28. One side of the bottom surface of the underground exhaust bunker 25 away from the vent pipe 28 is inclined downward. One side of the underground exhaust bunker 25 away from the vent pipe 28 is provided with a plurality of sewage drain pipes 23. A drain groove 22 is provided on the ground close to a water outlet end 64 of the sewage drain pipe 23. The bottom surface of the underground exhaust bunker 25 is uniformly provided with a plurality of support platforms 29. An upper end surface of the support platform 29 is connected with a lower end surface of the floor 27.

An air deflector 4 is provided between the sidewall 2 and the inner wall 18 above the partition 3 located below the wet curtain 14. The air deflector 4 includes a cambered-surface portion 63 at a lower end thereof, and a straight-surface portion 20 at an upper end thereof. The cambered-surface portion 63 of the air deflector 4 is provided between the sidewall 2 and the inner wall 18. The straight-surface portion 20 of the air deflector 4 is located above the inner roof 11. The straight-surface portion 20 is inclined upward and inward with an inclination angle equal to or slightly smaller than an inclination angle of the roof 13. Wherein, the cambered-surface portion 63 and the straight-surface portion 20 of the air deflector 4 are hinged through a damping shaft.

A warm water pipe 7 and/or an atomization pipeline 8 is provided on the gable located above the inner roof 11. The warm water pipe 7 has hot water circulating therein, and the atomization pipeline 8 is a piping uniformly provided with small holes. One end of the atomization pipeline 8 is connected with a high pressure water source, and another end of the atomization pipeline 8 is sealed. A pipe radius of the atomization pipeline 8 is small and a diameter of the small hole is very small. Cold water in the pipe is refined into a mist by the small holes, under an action of a high pressure.

Figure 5:
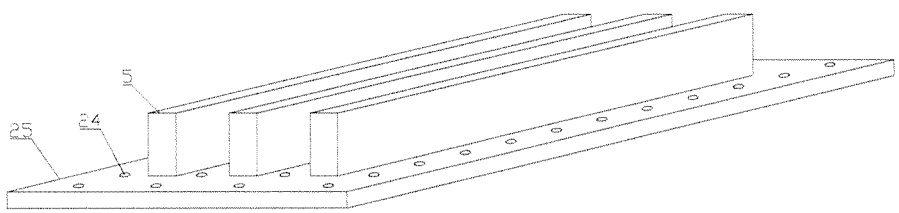
FIG. 5 is a structural schematic diagram of a wet curtain according to the embodiment of the present invention.
Figure 6:
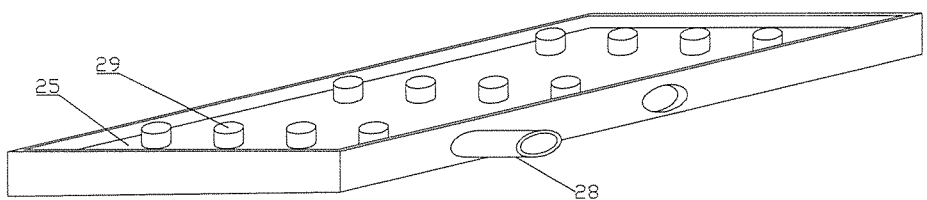
FIG. 6 is a front view of the wet curtain according to the embodiment of the present invention.

With reference to FIG. 5 and FIG. 6, the wet curtain 14 on the sidewall 2 includes a fixing plate 31. A wet curtain body 34 embedded on the fixing plate 31 and two thermal insulation curtains 71 provided on two sides of the wet curtain body 34. Two side surfaces of a middle portion of the fixing plate 31 are both inwardly recessed to form a central square plate 36 and a frame 65. A middle portion of the central square plate 36 is provided with a square through hole 66. The wet curtain body 34 is embedded on the square through hole 66 of the central square plate 36. The wet curtain body 34 is hermetically connected with the central square plate 36.

Figure 7:
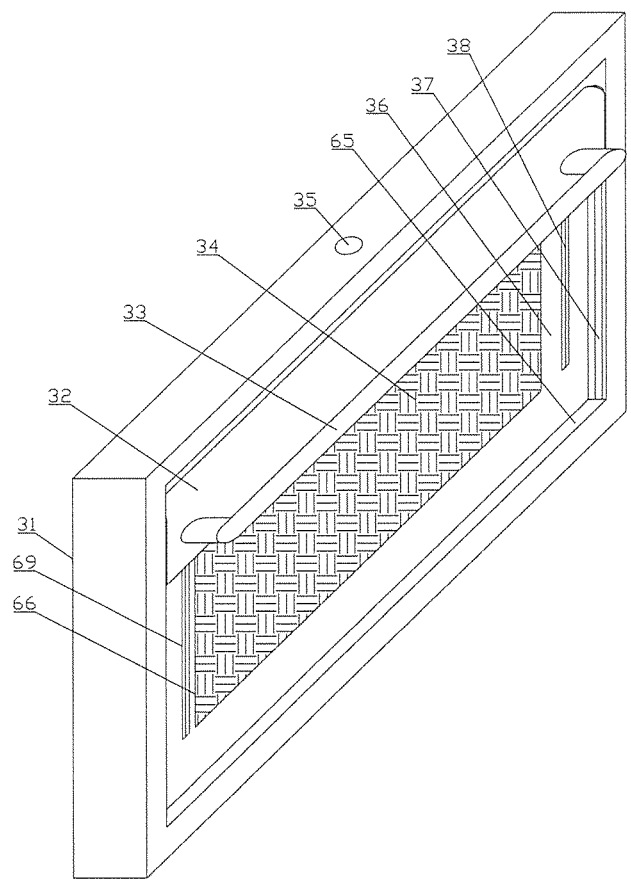
FIG. 7 is a cross-sectional side view of the wet curtain according to the embodiment of the present invention.

With reference to FIG. 7, the thermal insulation curtain 71 includes a scroll 40 and a curtain body 32. The scroll 40 is provided on the frame 65 on two sides of the central square plate 36. An upper end of the curtain body 32 is fixedly connected with the scroll 40. Left and right sides of the curtain body 32 are both fixedly connected with a plurality of rigid guide sheets 67 connected with each other in a head-to-tail manner. A lower end of the curtain body 32 is provided with a rigid connecting plate 68. The frame 65 on both sides of the curtain body 32 is provided with a slide groove 37 used in conjunction with the rigid guide sheet 67. One side of the rigid guide sheet 67 is fixedly connected with the curtain body 32, and another side is provided with a cylindrical guide post. The cylindrical guide post is located inside the slide groove 37. The guide post of the rigid guide sheet 67 is able to slide inside the slide groove 37, to play a role in limiting and guiding. The rigid guide sheet 67 is able to be wound on the scroll 40.

A water inlet 35 and a water outlet in communication with the wet curtain body 34 are respectively provided on the frames 65 located at an upper end and a lower end of the wet curtain body 34. The wet curtain body 34 includes a frame 65, a water storage tank, a water pump, a circulating water pipeline, and a honeycomb water curtain body. The circulating water pipe passes through the wall body to get connected with the water inlet 35 and the water outlet. The frame 65 of the wet curtain body 34 is hermetically fixed in the central square plate 36. The wet curtain body 34 is a prior art, which will not be repeatedly described here.

An outer surface of the rigid connecting plate 68 at the lower end of the curtain body 32 is provided with a handle 33. A lower-end surface of two ends of the handle 33 is respectively provided with a stopper pin 39. Two locking mechanisms 50 used in conjunction with the stopper pin 39 are provided within the frame 65 at the lower end of the wet curtain body 34.

Two connecting rods 41 are provided between the handles 33 on two sides of the wet curtain body 34. Two strip-shaped through holes 69 are provided on the central square plate 36 on both sides of the wet curtain body 34. The central square plate 36 is provided thereon with an elastic sealing tape 38 which seals the strip-shaped through hole 69. A slit 70 is provided in a middle portion of the sealing tape 38. The connecting rod 41 passes through the slit 70 of the sealing tape 38 to get connected with the handle 33. The connecting rod 41 is so provided that the inner and the outer thermal insulation curtains 71 may be conveniently pulled down simultaneously, for convenience of use.

Figure 8:
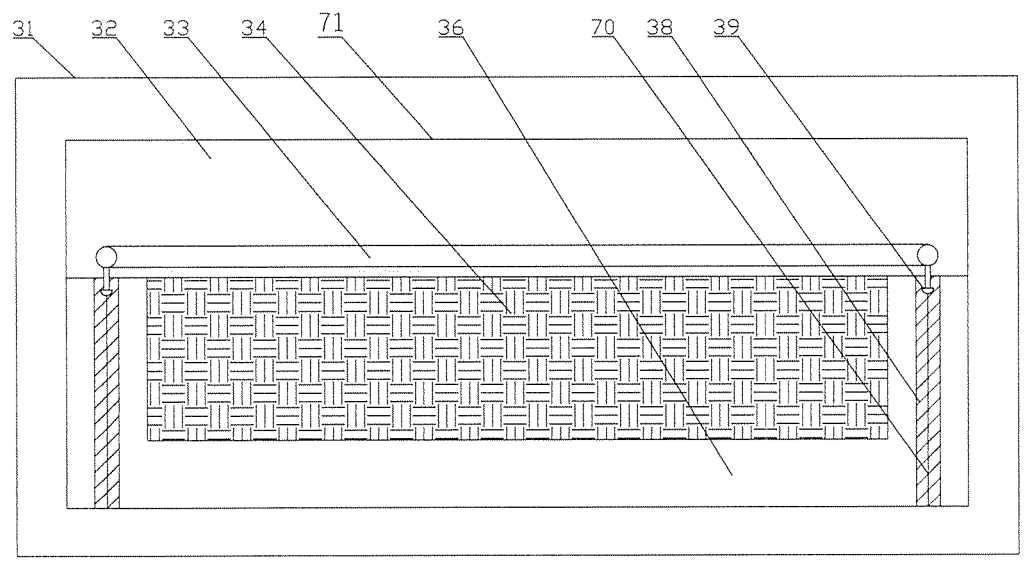
FIG. 8 is a structural schematic diagram of a wet curtain locking mechanism according to the embodiment of the present invention.

With reference to FIG. 8, the locking mechanism 50 includes a fixed clamp arm 51 and a movable clamp arm 55. The fixed clamp arm 51 is hinged with a middle portion of the movable clamp arm 55 and is provided with a torsion spring 52. An inner side of an upper end of the fixed clamp arm 51 is provided with an L-shaped notch 56. An inner side of an upper end of the movable clamp arm 55 is provided with an arc-surfaced notch 59. An inner side of the movable clamp arm 55 located below the arc-surfaced notch 59 is provided with an L-shaped notch 56. A protruding limit stopper 57 is formed between the arc-surfaced notch 59 and the L-shaped notch 56 of the movable clamp arm 55. The L-shaped notch 56 of the movable clamp arm 55 corresponds in position to the L-shaped notch 58 of the fixed clamp arm 51. An inner side of the lower end of the fixed clamp arm 51 is provided with an electromagnet 53. An inner side of the lower end of the movable clamp arm 55 is provided with an adsorption iron plate 54 used in conjunction with the electromagnet 53. All of the electromagnets 53 are connected with a power source through a normally open button switch, and the normally open button switch is provided on the inner wall of the henhouse close to the wet curtain according to the present invention. The stopper pin 39 includes a connecting post 42 fixed to a lower-end surface of the handle 33 and a hemispherical fixture block 43 provided at a lower end of the connecting post 42. The connecting post 42 is located at an edge of a circular surface of the fixture block 43. When the stopper pin 39 is in a locked state, the connecting post 42 is located within the L-shaped notch 58 of the fixed clamp arm 51. The movable clamp arm 55 is provided thereon with the arc-surfaced notch 59 to facilitate the hemispherical fixture block 43 to enter in the two L-shaped notches. A depth of the L-shaped notch 56 of the movable clamp arm 55 is greater than a radius of the fixture block 43, to facilitate releasing the stopper pin 39, when the thermal insulation curtain 71 is rolled up.

The fixing plate 31 is hermetically embedded in the wall body. A circulating water pipe in communication with the water inlet 35 and the water outlet is provided in the wall body.

The rigid guide sheet 67 and the rigid connecting plate 68 are both made of stainless steel. The sealing tape 38 is made of rubber. The curtain body 32 of the thermal insulation curtain 71 includes a waterproof inner layer, a waterproof outer layer, and a thermal insulation layer. The waterproof inner layer and the waterproof outer layer are made of waterproof cloth, and the thermal insulation layer is made of thermal insulation cotton or glass wool felt.

When the henhouse does not need to be cooled down by the wet curtain body 34, it is only necessary to pull down the thermal insulation curtains 71 on the inner side and the outer side of the wet curtain body 34. Since there is the connecting rod 41 provided between the handles 33 of the inner and the outer thermal insulation curtains 71, by pulling the thermal insulation curtain 71 on one side, the thermal insulation curtain 71 on the other side may be mobilized, and the operation may be completed by one person at a time. When the thermal insulation curtain 71 is pulled down to the bottom, the stopper pin 39 enters in the two L-shaped notches (56 and 58) through the locking mechanism 50, and the limit stopper 57 blocks the stopper pin 39, so that the stopper pin 39 is locked in the locking mechanism 50. When the henhouse needs ventilation, the normally open button switch is pressed down to energize the electromagnet 53 to adsorb the adsorption iron plate 54, so that the upper end of the movable clamp arm 55 moves away from the fixed clamp arm 51, while the thermal insulation curtain 71 as mobilized by the torsion spring of the scroll 40 moves upwards, disengaged from the locking mechanism 50, and then the thermal insulation curtain 71 is rolled up to implement normal ventilation of the henhouse.

Technical features not described in the present invention may be implemented with the prior art, which will not be repeated here. Of course, the above description is not limitative of the present invention, and the present invention is not merely limited to the above examples. Variations, modifications, additions or replacements made by those ordinarily skilled in the art within the substantive scope of the present invention should be also covered within the protection scope of the present invention.

The invention claimed is:

1. A premixed underground ventilated henhouse, comprising a gable, two sidewalls, an outer roof, and a floor, wherein, an inner chamber parallel to the two sidewalls is provided in the middle of the henhouse, a rearing cage of the henhouse is located in the inner chamber, and the inner chamber is surrounded by two inner walls parallel to the two sidewalls and an inner roof;

a partition is hermetically provided between each of the sidewalls and a respective one of the inner walls, an air inlet plate is provided between the two inner walls and is located below the inner roof, a pressure chamber is formed between the inner roof and the air inlet plate, a premixing chamber is formed between the inner roof and the outer roof, a plurality of fans and a plurality of air inlet windows are uniformly provided on the inner roof, a plurality of air inlet holes and a plurality of small inlet windows are uniformly provided on the air inlet plate, a plurality of wet curtains are provided on each of the sidewalls and are located above the partition, a plurality of air outlet slots are uniformly provided on each of the inner walls and are located below the partition, and a first air vent and a fan are provided on each of the sidewalls and are located below the partition;

an underground exhaust bunker is provided under the floor, a plurality of through holes in communication with the underground exhaust bunker are provided on the floor, a plurality of second air vents are provided on one side of the underground exhaust bunker, the second air vents are in communication with a vent pipe, a fan is provided in a lower end of the vent pipe, and an air outlet is provided at an upper end of the vent pipe.

2. The premixed underground ventilated henhouse according to claim 1, wherein, an air deflector is provided between each of the sidewalls and a respective one of the inner walls, the air deflector is disposed above the partition, and the partition is located below the wet curtain, the air deflector includes a cambered-surface portion at a lower end thereof, and a straight-surface portion at an upper end thereof, the cambered-surface portion of the air deflector is provided between each of the sidewalls and the respective inner wall, the straight-surface portion of the air deflector is located above the inner roof, the straight-surface portion is inclined upward and inward with an inclination angle equal to smaller than an inclination angle of the roof, the cambered-surface portion and the straight-surface portion of the air deflector are integrally formed as one piece.

3. The premixed underground ventilated henhouse according to claim 1, wherein, a warm water pipe and/or an atomization pipeline is provided on the gable and is located above the inner roof, the warm water pipe has hot water circulating therein, the atomization pipeline is a piping uniformly provided with small holes, one end of the atomization pipeline is connected with a high pressure water source, and another end of the atomization pipeline is sealed off.

4. The premixed underground ventilated henhouse according to claim 1, wherein, a side of a bottom surface of the underground exhaust bunker away from the vent pipe is inclined downward, the side of the underground exhaust bunker away from the vent pipe is provided with a plurality of sewage drain pipes, and a drain groove is provided on a ground and is connected to a water outlet end of the sewage drain pipe.

5. The premixed underground ventilated henhouse according to claim 1, wherein, a bottom surface of the underground exhaust bunker is uniformly provided with a plurality of support platforms, and an upper-end surface of the support platform is connected with a lower-end surface of the floor.

6. The premixed underground ventilated henhouse according to claim 1, wherein, the wet curtain includes a fixing plate, a wet curtain body embedded on the fixing plate, and two thermal insulation curtains respectively provided on inner and outer sides of the wet curtain body;

two side surfaces of a middle portion of the fixing plate are both inwardly recessed to form a central square plate and a frame, a middle portion of the central square plate is provided with a square through hole, the wet curtain body is embedded with the square through hole of the central square plate, and the wet curtain body is hermetically connected with the central square plate;

each of the thermal insulation curtain includes a scroll and a curtain body, the scroll is provided on the frame, an upper end of the curtain body is fixedly connected with the scroll, left and right sides of the curtain body are both fixedly connected with a plurality of rigid guide sheets connected with each other in a head-to-tail manner, a lower end of the curtain body is provided with a rigid connecting plate, and the frame on the left and right sides of the curtain body is provided with a slide groove used in conjunction with the rigid guide sheet; and a water inlet and a water outlet in communication with the wet curtain body are respectively provided on an upper end of the frame and a lower end of the frame.

7. The premixed underground ventilated henhouse according to claim 6, wherein, two handles are respectively provided on the inner and outer sides of the wet curtain body, each handle is located at an outer surface of the rigid connecting plate of the curtain body, and each handle has two ends, each end having a lower-end surface fixed with a stopper pin, and four locking mechanisms respectively used in conjunction with the stopper pins of the two handles are provided within the frame and are located at the lower end of the wet curtain body.

8. The premixed underground ventilated henhouse according to claim 7, wherein, two connecting rods are provided between the two handles on two sides of the wet curtain body, the central square plate has two strip-shaped through holes, one on each side of the central square plate, the wet curtain body is located between the two strip-shaped through holes, the central square plate is provided with elastic sealing tapes which respectively seal the strip-shaped through holes, a slit is provided between the sealing tapes, and each of the connecting rods passes through the slit and is fixedly connected to the handle.

9. The premixed underground ventilated henhouse according to claim 6, wherein, the locking mechanism includes a fixed clamp arm and a movable clamp arm, the fixed clamp arm is hinged with a middle portion of the movable clamp arm and is provided with a torsion spring, an inner side of an upper end of the fixed clamp arm is provided with an L-shaped notch, an inner side of an upper end of the movable clamp arm is provided with an arc-surfaced notch, an inner side of the movable clamp arm located below the arc-surfaced notch is provided with an L-shaped notch, a protruding limit stopper is formed between the arc-surfaced notch and the L-shaped notch of the movable clamp arm, and the L-shaped notch of the movable clamp arm corresponds in position to the L-shaped notch of the fixed clamp arm, an inner side of a lower end of the fixed clamp arm is provided with an electromagnet, and an inner side of the lower end of the movable clamp arm is provided with an adsorption iron plate used in conjunction with the electromagnet;

the stopper pin includes a connecting post fixed to a lower-end surface of the handle, and a hemispherical fixture block provided at a lower end of the connecting post.

10. The premixed underground ventilated henhouse according to claim 6, wherein, the fixing plate is hermetically embedded in a wall body, and a circulating water pipe in communication with the water inlet and the water outlet is provided in the wall body.

11. The premixed underground ventilated henhouse according to claim 2, wherein, a warm water pipe and/or an atomization pipeline is provided on the gable and is located above the inner roof, the warm water pipe has hot water circulating therein, the atomization pipeline is a piping uniformly provided with small holes, one end of the atomization pipeline is connected with a high pressure water source, and another end of the atomization pipeline is sealed off.

12. The premixed underground ventilated henhouse according to claim 2, wherein, a side of a bottom surface of the underground exhaust bunker away from the vent pipe is inclined downward, the side of the underground exhaust bunker away from the vent pipe is provided with a plurality of sewage drain pipes, and a drain groove is provided on a ground and is connected to a water outlet end of the sewage drain pipe.

13. The premixed underground ventilated henhouse according to claim 3, wherein, a side of a bottom surface of the underground exhaust bunker away from the vent pipe is inclined downward, the side of the underground exhaust bunker away from the vent pipe is provided with a plurality of sewage drain pipes, and a drain groove is provided on a ground and is connected to a water outlet end of the sewage drain pipe.

14. The premixed underground ventilated henhouse according to claim 2, wherein, a bottom surface of the underground exhaust bunker is uniformly provided with a plurality of support platforms, and an upper-end surface of the support platform is connected with a lower-end surface of the floor.

15. The premixed underground ventilated henhouse according to claim 3, wherein, a bottom surface of the underground exhaust bunker is uniformly provided with a plurality of support platforms, and an upper-end surface of the support platform is connected with a lower-end surface of the floor.

16. The premixed underground ventilated henhouse according to claim 4, wherein, a bottom surface of the underground exhaust bunker is uniformly provided with a plurality of support platforms, and an upper-end surface of the support platform is connected with a lower-end surface of the floor.

17. The premixed underground ventilated henhouse according to claim 2, wherein the wet curtain includes a fixing plate, a wet curtain body embedded on the fixing plate, and two thermal insulation curtains respectively provided on inner and outer sides of the wet curtain body;
    two side surfaces of a middle portion of the fixing plate are both inwardly recessed to form a central square plate and a frame, a middle portion of the central square plate is provided with a square through hole, the wet curtain body is embedded with the square through hole of the central square plate, and the wet curtain body is hermetically connected with the central square plate;
    each of the thermal insulation curtains includes a scroll and a curtain body, the scroll is provided on the frame, an upper end of the curtain body is fixedly connected with the scroll, left and right sides of the curtain body are both fixedly connected with a plurality of rigid guide sheets connected with each other in a head-to-tail manner, a lower end of the curtain body is provided with a rigid connecting plate, and the frame on the left and right sides of the curtain body is provided with a slide groove used in conjunction with the rigid guide sheet; and
    a water inlet and a water outlet in communication with the wet curtain body are respectively provided on an upper end of the frame and a lower end of the frame.

18. The premixed underground ventilated henhouse according to claim 3, wherein the wet curtain includes a fixing plate, a wet curtain body embedded on the fixing plate, and two thermal insulation curtains respectively provided on inner and outer sides of the wet curtain body;
    two side surfaces of a middle portion of the fixing plate are both inwardly recessed to form a central square plate and a frame, a middle portion of the central square plate is provided with a square through hole, the wet curtain body is embedded with the square through hole of the central square plate, and the wet curtain body is hermetically connected with the central square plate;
    each of the thermal insulation curtains includes a scroll and a curtain body, the scroll is provided on the frame, an upper end of the curtain body is fixedly connected with the scroll, left and right sides of the curtain body are both fixedly connected with a plurality of rigid guide sheets connected with each other in a head-to-tail manner, a lower end of the curtain body is provided with a rigid connecting plate, and the frame on the left and right sides of the curtain body is provided with a slide groove used in conjunction with the rigid guide sheet; and
    a water inlet and a water outlet in communication with the wet curtain body are respectively provided on an upper end of the frame and a lower end of the frame.

19. The premixed underground ventilated henhouse according to claim 4, wherein the wet curtain includes a fixing plate, a wet curtain body embedded on the fixing plate, and two thermal insulation curtains respectively provided on inner and outer sides of the wet curtain body;
    two side surfaces of a middle portion of the fixing plate are both inwardly recessed to form a central square plate and a frame, a middle portion of the central square plate is provided with a square through hole, the wet curtain body is embedded with the square through hole of the central square plate, and the wet curtain body is hermetically connected with the central square plate;
    each of the thermal insulation curtains includes a scroll and a curtain body, the scroll is provided on the frame, an upper end of the curtain body is fixedly connected with the scroll, left and right sides of the curtain body are both fixedly connected with a plurality of rigid guide sheets connected with each other in a head-to-tail manner, a lower end of the curtain body is provided with a rigid connecting plate, and the frame on the left and right sides of the curtain body is provided with a slide groove used in conjunction with the rigid guide sheet; and
    a water inlet and a water outlet in communication with the wet curtain body are respectively provided on an upper end of the frame and a lower end of the frame.

20. The premixed underground ventilated henhouse according to claim 5, wherein the wet curtain includes a fixing plate, a wet curtain body embedded on the fixing plate, and two thermal insulation curtains respectively provided on inner and outer sides of the wet curtain body;
    two side surfaces of a middle portion of the fixing plate are both inwardly recessed to form a central square plate and a frame, a middle portion of the central square plate is provided with a square through hole, the wet curtain body is embedded with the square through hole of the central square plate, and the wet curtain body is hermetically connected with the central square plate;
    each of the thermal insulation curtains includes a scroll and a curtain body, the scroll is provided on the frame, an upper end of the curtain body is fixedly connected with the scroll, left and right sides of the curtain body are both fixedly connected with a plurality of rigid guide sheets connected with each other in a head-to-tail manner, a lower end of the curtain body is provided with a rigid connecting plate, and the frame on the left and right sides of the curtain body is provided with a slide groove used in conjunction with the rigid guide sheet; and
    a water inlet and a water outlet in communication with the wet curtain body are respectively provided on an upper end of the frame and a lower end of the frame.

* * * * *